United States Patent
Finn et al.

(10) Patent No.: US 8,509,299 B2
(45) Date of Patent: Aug. 13, 2013

(54) DECISION FEEDBACK EQUALIZER OPERABLE WITH MULTIPLE DATA RATES

(75) Inventors: Steven E. Finn, Atlanta, GA (US); Soumya Chandramouli, Atlanta, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 171 days.

(21) Appl. No.: 13/187,693

(22) Filed: Jul. 21, 2011

(65) Prior Publication Data
US 2013/0021074 A1   Jan. 24, 2013

(51) Int. Cl.
*H03H 7/30* (2006.01)
*H03H 7/40* (2006.01)
*H03K 5/159* (2006.01)

(52) U.S. Cl.
USPC ........... 375/233; 375/229; 375/230; 375/231; 375/232; 375/234; 375/235; 333/18; 333/28 R; 708/300; 708/322; 708/323; 379/340; 379/398; 327/162

(58) Field of Classification Search
USPC ......... 375/229–236; 333/18, 28 R; 708/300, 708/322, 323; 379/340, 398
See application file for complete search history.

(56) References Cited

U.S. PATENT DOCUMENTS

| | | | |
|---|---|---|---|
| 7,330,508 B2 | 2/2008 | Momtaz | |
| 7,822,113 B2 | 10/2010 | Tonietto et al. | |
| 2005/0254569 A1* | 11/2005 | Momtaz | 375/233 |
| 2008/0080610 A1 | 4/2008 | Aziz et al. | |
| 2010/0046601 A1* | 2/2010 | Momtaz et al. | 375/233 |
| 2011/0228821 A1* | 9/2011 | Van Der Horst et al. | 375/211 |

OTHER PUBLICATIONS

IEEE Journal of Solid-State Circuits, "A 6.25-Ob/s Binary Transceiver in 0.13-um CMOS for Serial Data Transmission Across High Loss Legacy Backplane Channels" vol. 40, No. 12, 12 pages, Dec. 2005.

\* cited by examiner

*Primary Examiner* — Sam K Ahn
*Assistant Examiner* — Fabricio R Murillo Garcia
(74) *Attorney, Agent, or Firm* — Eugene C. Conser; Wade J. Brady, III; Frederick J. Telecky, Jr.

(57) ABSTRACT

Decision feedback equalization (DFE) circuitry and method for equalizing data signals over a wide range of data rates. By using delayed and controlled versions of the recovered data clock to retime the equalized data signal for feedback via the DFE taps, correct feedback signal timing is maintained and jitter tolerance is increased at high data rates.

8 Claims, 6 Drawing Sheets

DECISION FEEDBACK EQUALIZER OPERABLE WITH MULTIPLE DATA RATES

BACKGROUND

The present invention relates to equalizer circuits for data signals, and in particular, to decision feedback equalizer circuits capable of processing multiple data rates.

As digital communication systems continue to be developed with ever increasing data rates, challenges grow for maintaining signal integrity for higher serial data rates. To meet the demands on signal integrity, systems beyond currently existing linear equalizers are needed. One such system is a decision feedback equalizer (DFE) that provides compensation for channel imperfections and bandwidth limitations, crosstalk and low signal-to-noise ratio (SNR). However, current DFE systems fail to provide predictable feedback at the input summation node, and most are capable of working at only a signal data rate and have limited jitter tolerance.

Referring to FIG. 1, as is well known, a typical communications channel will have serial data 11 having a high data rate (e.g., 12 gigabits per second) which is transmitted by a transmitter 12 as a high frequency data signal 13 for conveyance by a communications medium 14 (e.g., coaxial or fiber optic cable) for reception by a linear equalizer 16. The equalized signal 17 is then further compensated by a DFE 18 to provide data 19 for further downstream processing (not shown). However, problems can develop due to discontinuities 15 in the communications path, as well as crosstalk 21 from an adjacent channel 20, both of which introduce further undesirable non-linear signal effects.

A DFE 18 is difficult to implement for reliable operation at high data rates. For example, at a data rate of 10 gigabits per second, a bit width, or unit interval (UI), is 100 picoseconds. For good SNR and bit error rate (BER), this results in an optimal sampling point, which is at the center of the data eye, with only 50 picoseconds available to feed the data back to the input summation node. Further difficulties arise with changes in the data rate and signal jitter.

Referring to FIG. 2, one conventional solution is a DFE 30a which is capable of operating reliably at only one data rate. In accordance with well-known techniques, the incoming data signal 17 is summed in the input summation node 32 with one or more feedback signals 41. The resulting combined, or summed, signal 33 is successively re-timed by multiple latch circuits 34, 36 clocked by the recovered data clock 31. The final latched signal 37 is delayed with delay circuitry 38 having a fixed delay to provide the equalized data 39, which is also fed back via one or more DFE feedback taps 40 (discussed in more detail below). It is the fixed delay of this output delayed circuitry 38 that determines the data rate for which such circuitry 30a is suitable.

Referring to FIG. 3, an alternative DFE 30b uses delay circuitry 38a with a variable delay. However, this variable delay must be controllable so as to be reset for various data rates. Such variable delay also requires sufficient resolution, or granularity, in delay line settings to meet system SNR and BER requirements. Further, the data rate must be known ahead of time, or must be capable of being sensed prior. Such variability can also be problematic in terms of its compatibility with DFE adaptation algorithms, and also increases adaptation timing.

Referring to FIG. 4, an alternative conventional DFE 30c uses no additional delay in the output, but instead introduces delay to the clock signal 31 with a delay circuitry 42 in the clock signal path. Such delay can be fixed or variable, and provides a delayed clock signal 43 for the data latches 34, 36.

However, in addition to the problems associated with the DFE 30b of FIG. 3, this DFE 30c also relies on interpolation of two clock phases to provide proper timing for the feedback signal 41.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit dice or chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks may be implemented in a single piece of hardware.

In accordance with the presently claimed invention, decision feedback equalization (DFE) circuitry and method are provided for equalizing data signals over a wide range of data rates. By using delayed and controlled versions of the recovered data clock to retime the equalized data signal for feedback via the DFE taps, correct feedback signal timing is maintained and jitter tolerance is increased at high data rates.

Figure 1:
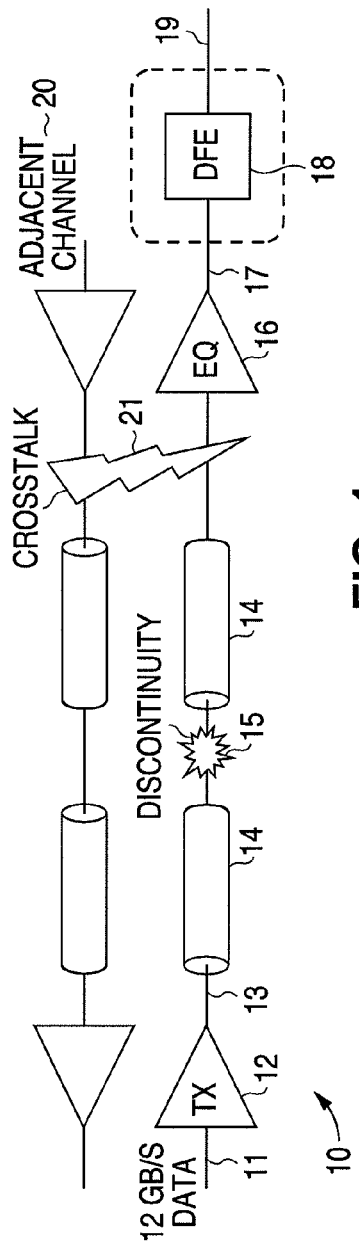
FIG. 1 depicts a conventional data signal communications path.
Figure 2:
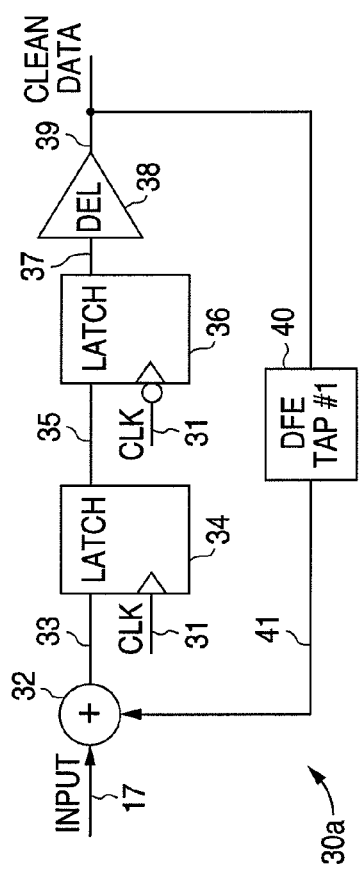
FIGS. 2, 3 and 4 are functional block diagrams of conventional decision feedback equalizer circuits.
Figure 3:
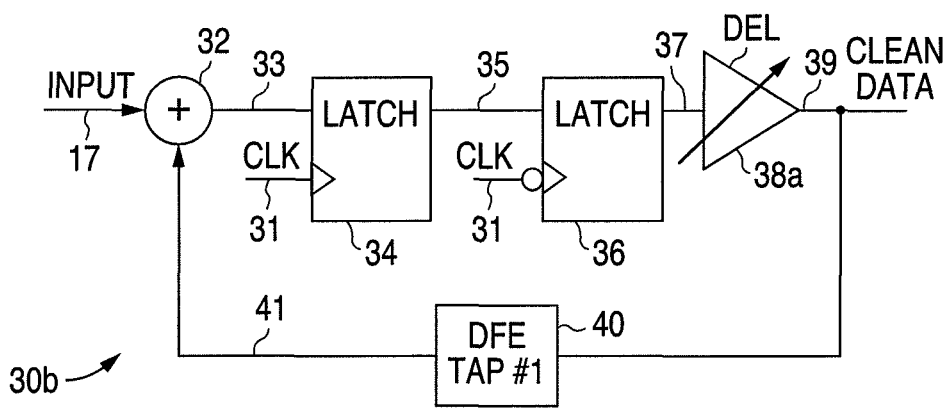
Figure 4:
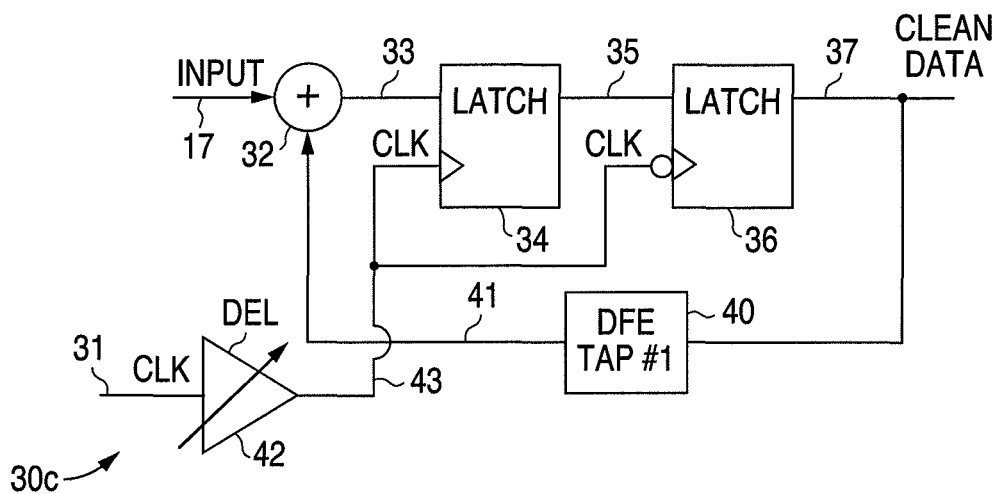
Figure 5:
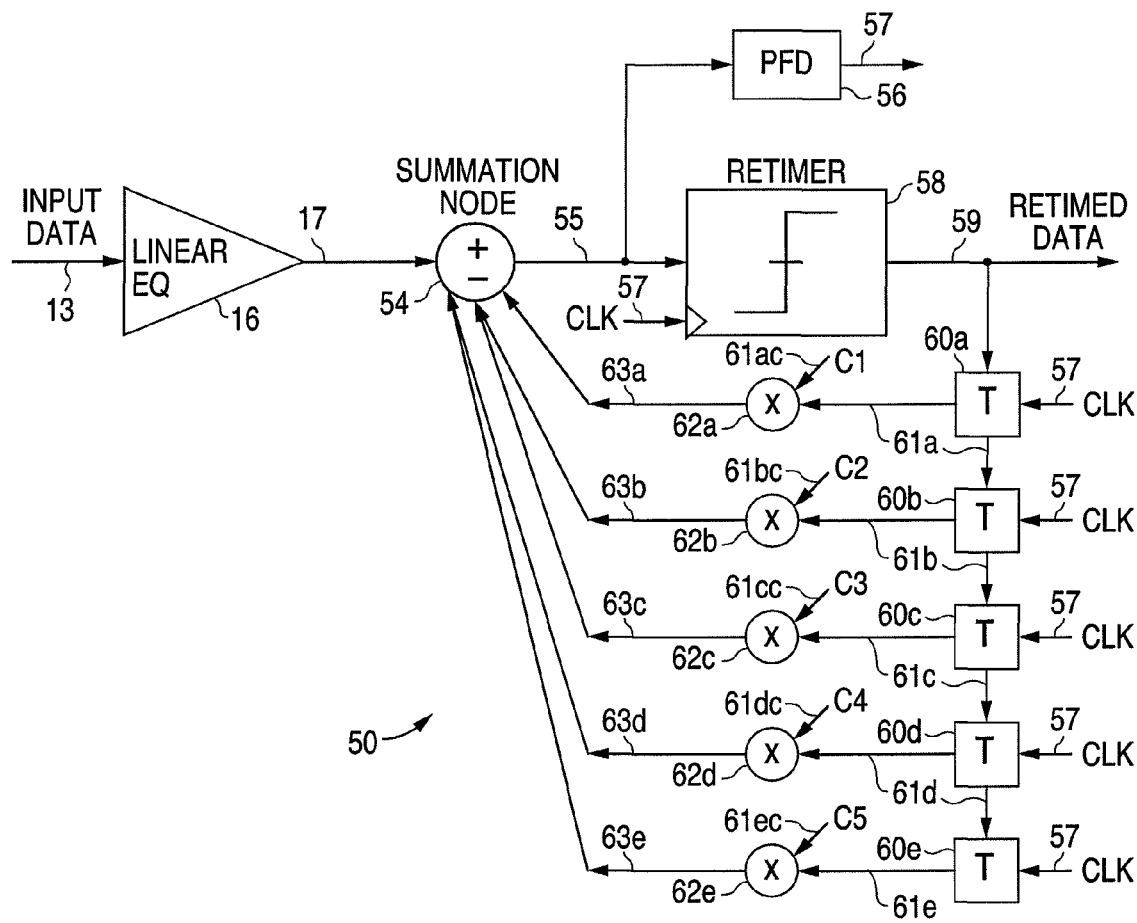
FIG. 5 is a more detailed function block diagram of a conventional decision feedback equalizer.

Referring to FIG. 5, the input data 13 is first equalized by a linear equalizer 16. The resulting equalized signal 17 is combined, e.g., differentially summed, in the summation node 54 with the DFE tap feedback signals 63a, 63b, 63c, 63d, 63e. The resulting combined signal 55 is used by a clock data recovery (CDR) circuit 56, such as a phase-frequency detector (PFD), many types of which are well known in the art, to recover the data clock 57.

The combined signal 55 is also retimed in retiming circuitry 58 (e.g., latch or shift register circuitry), in accordance with the recovered data clock 57. The resulting retimed data signal 59 is further successively retimed with a series of additional retiming circuits 60a, 60b, 60c, 60d, 60e, in accordance with the recovered data clock 57. Each of these successively retimed data signals 61a, 61b, 61c, 61d, 61e is scaled with a respective scaling factor 61ac, 61bc, 61cc, 61dc, 61ec in a scaling circuit (e.g., multiplier circuitry) 62a, 62b, 62c, 62d, 62e. The resulting scaled data signals 63a, 63b, 63c, 63d, 63e serve as the DFE tap feedback signals for the input summation node 54. As is well known in the art, such DFE circuitry 50 removes post-cursor inter-symbol interference (ISI), by determining prior bits and making appropriate correction to the current bit prior to sampling by the retimer 58.

Figure 6:
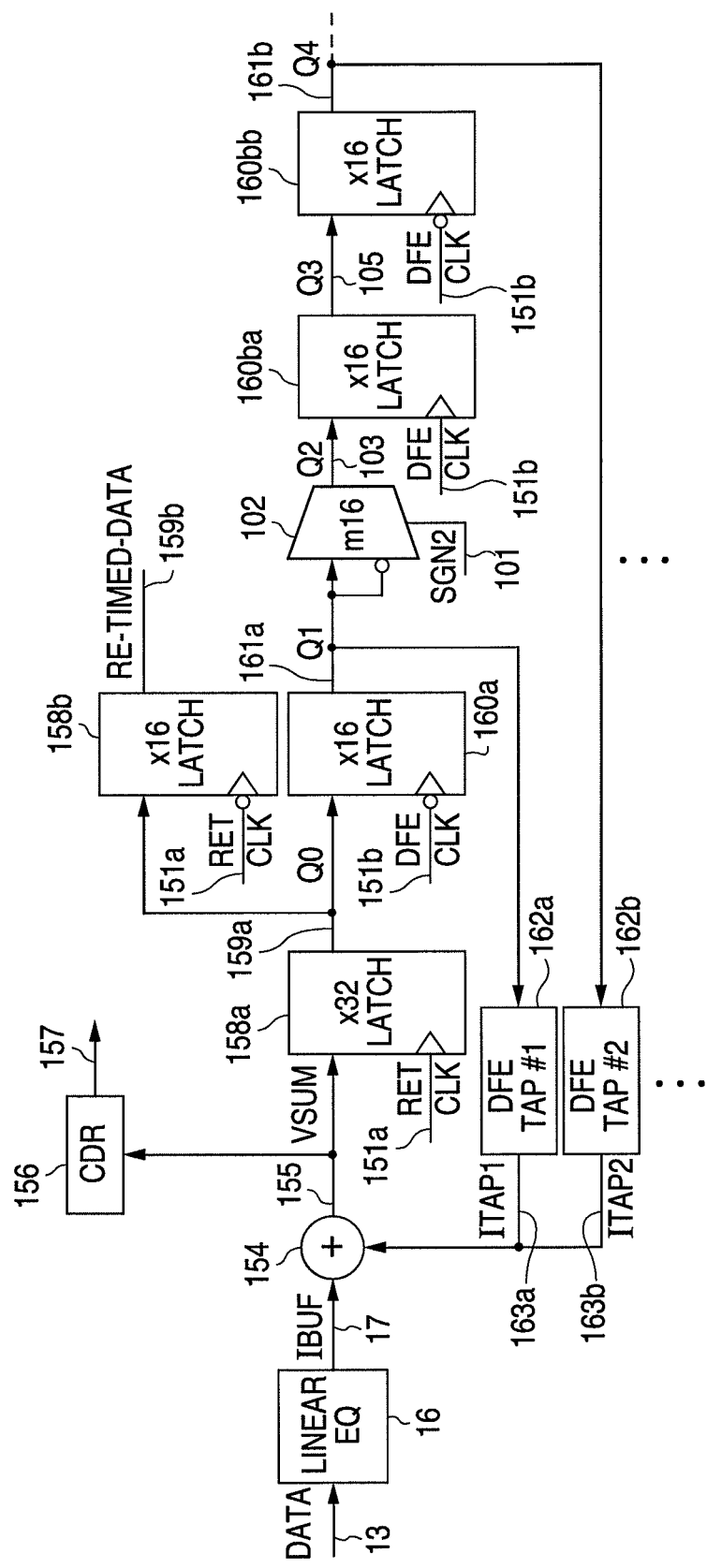
FIG. 6 is a functional block diagram of a decision feedback equalizer in accordance with one embodiment of the presently claimed convention.

Referring to FIG. 6, DFE circuitry 100 for processing multiple data rates in accordance with one embodiment of the presently claimed invention can include DFE circuit elements substantially as shown. As discussed above, the initially equalized data signal 17 is combined at the input summation node 154 with the DFE tap feedback signals 163a, 163b (e.g., scaled using circuitry as discussed above for FIG. 5). (The circuit 100 of FIG. 6 includes two feedback paths; however, it will be readily understood by one of ordinary skilled in the art that additional feedback paths can be used, depending upon the desired equalization.) The resulting combined signal 155 is used by clock data recovery circuitry 156 to recover the data clock 157. This signal 155 is also retimed in signal retiming circuitry 158a, in accordance with a retiming clock 151a (discussed in more detail below). This first retimed data signal 159a is further retimed in further retiming circuitry 158b, in accordance with the retiming clock 151a, to produce retimed data 159b for further downstream processing (not shown).

The first retimed data signal 159a is also used for the decision feedback equalization. This signal 159a is further retimed by further retiming circuitry 160a, in accordance with a controlled clock 151b (discussed in more detail below). The resulting second retimed data signal 161a serves as the first DFE feedback signal for processing by the first DFE tap circuitry 162a (e.g., scaling as discussed above).

This second retimed data signal 161a is further retimed using additional retiming circuitry 160ba, 160bb, in accordance with the controlled clock 151b, to produce the retimed data signal 161b that serves as the DFE feedback signal for the second DFE tap circuitry 162b. Also, as an option, a multiplexor 102 can be included in the second DFE feedback signal path for selecting the second retimed data signal 161a or its inverted form, in accordance with a selection control signal 101, to serve as the retimed data signal 103 for feedback via the second DFE tap 162b and any further downstream retiming (not shown). (While two stages of retiming are shown (retiming circuitry 160ba, 160bb) for the second feedback signal path, fewer or more stages can be used depending upon the desired equalization.)

Figure 7:
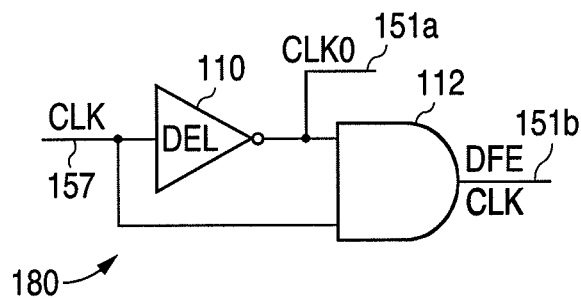
FIG. 7 is a functional block diagram of clock circuitry for generating the clock signal for the circuitry of FIG. 6.

Referring to FIG. 7, in accordance with an exemplary embodiment, the clock circuitry 180 for producing the retiming clock 151a and controlled clock 151b can be implemented substantially as shown. The recovered data clock 157 is delayed and inverted by delay circuitry 110 (which can be implemented in any of many ways well known in the art). This produces the retiming clock 151a. The recovered data clock 157 is combined, e.g., logically ANDed in logic AND circuitry 112, to produce the controlled clock 151b.

By delaying and inverting the recovered data clock signal 157 and logically combining such delayed and inverted clock signal 151a with the original clock signal 157, the resulting controlled clock 151b has a constant positive signal width (e.g., an asserted signal state of constant duration), and thus a duty cycle that varies with the data rate. In other words, the controlled clock 151b has a duty cycle that is proportional to the data clock 157 rate.

In accordance with well-known integrated circuit design and fabrication techniques, the circuit elements used to implement the delay circuitry 110 and logic circuitry 112 can be designed to be matched with respect to performance variations due to variations in device and circuit fabrication processes, operating voltages and operating temperatures (PVT). As a result, the timing of the feedback signals 163a, 163b (FIG. 6) can be ensured to be correct for all data rates up to an operating frequency of approximately 1/(2T), where T is the duration of delay provided by the delay circuitry 110. Additionally, no circuit tuning or trimming is required and such clock circuitry 180 can be easily integrated into existing clock and data recovery circuitry.

Figure 8:
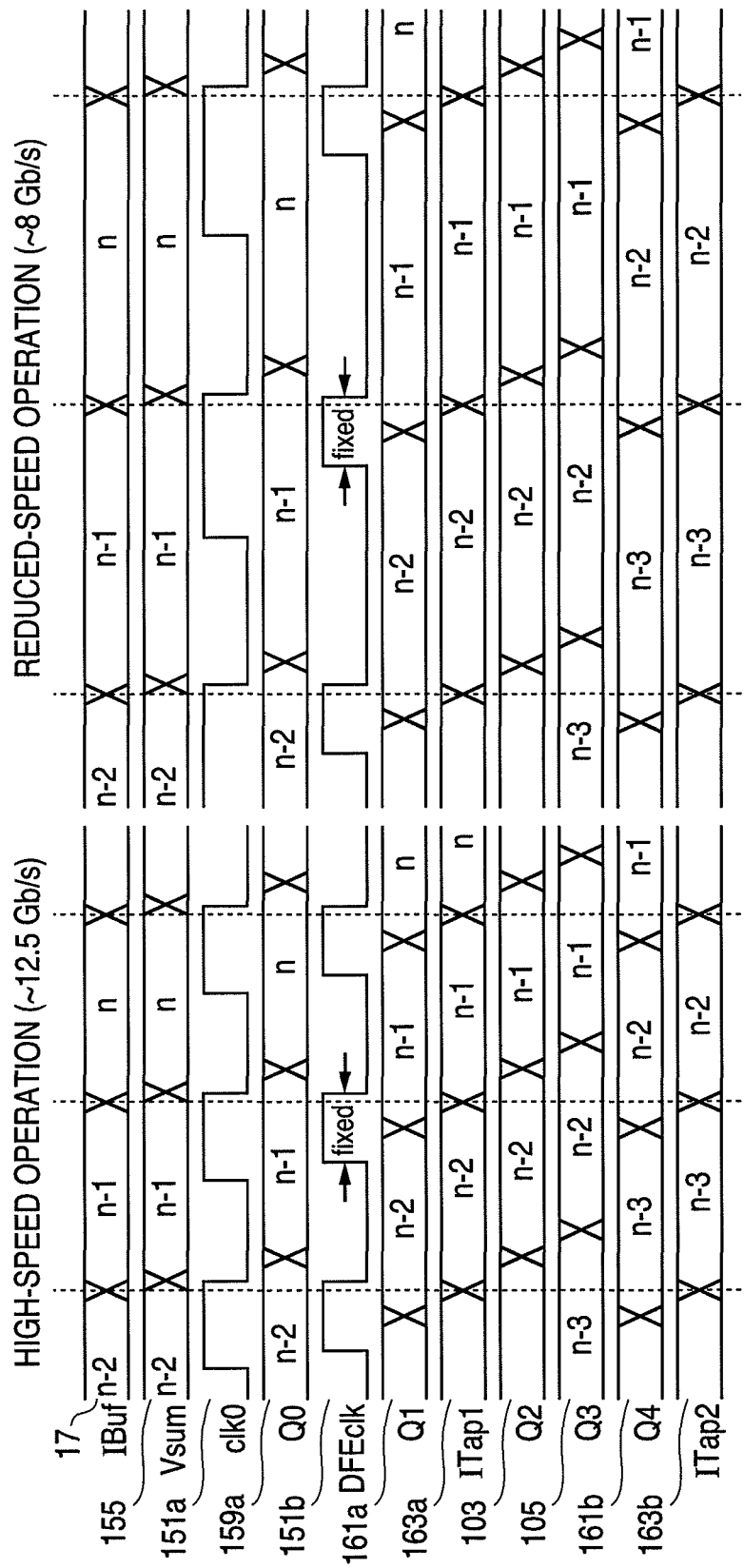
FIG. 8 is a signal timing diagram depicting the relative timing of the signals of the circuitry of FIG. 6.

Referring to FIG. 8, the result of using such a controlled clock 151b having a fixed asserted state duration with a duty cycle proportional to the data clock rate is depicted for two data rates. The waveforms on the left side are for higher speed operation (e.g., 12.5 gigabits per second), while the waveforms are on the right side are for lower speed operation (e.g., 8 gigabits per second), according to simulations. It can be seen that for higher speed operation (left side), the first retiming circuitry 158a will have a 50% percent duty cycle clock and jitter tolerance of approximately +/−0.5 UI. At lower operating speeds (right side), the first retiming circuitry 158a will have a lower duty cycle clock and will precisely feed back the tap signals 163a, 163b (FIG. 6) at the next data signal edge. (It should be readily appreciated that, as one moves from one signal to the next from top to bottom in these timing diagrams, the successive signal delays are the result of the circuit elements, e.g., retiming circuits, operating between the successive signal nodes.)

Figure 9:
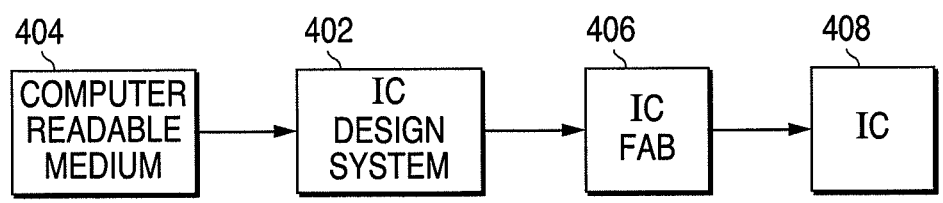
FIG. 9 is a functional block diagram of an exemplary embodiment of an integrated circuit design and fabrication system operated in accordance with computer instructions.

Referring to FIG. 9, integrated circuit (IC) design systems 402 (e.g., work stations with digital processors) are known that create integrated circuits based on executable instructions stored on a computer readable medium 404, e.g., including memory such as but not limited to CD-ROM, DVD-ROM, other forms of ROM, RAM, hard drives, distributed memory, or any other suitable computer readable medium. The instructions may be represented by any programming language, including without limitation hardware descriptor language (HDL) or other suitable programming languages. The computer readable medium contains the executable instructions (e.g., computer code) that, when executed by the IC design system 404 (e.g., by a work station or other form of computer), cause an IC fabrication system 406 to produce an IC 408 that includes the devices or circuitry as set forth herein. Accordingly, the devices or circuits described herein may be produced as ICs 408 by such IC design systems 402 executing such instructions.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a decision feedback equalizer operable with a plurality of data rates, comprising:

decision feedback equalization circuitry responsive to an incoming data signal, a retiming clock signal and a controlled clock signal by providing a retimed equalized data signal, wherein said incoming data signal has associated therewith a data clock having a data clock rate equal to one of a plurality of data clock rates; and clock circuitry coupled to said decision feedback equalization circuitry and responsive to a clock signal Corresponding to said data clock by providing said retiming clock signal and said controlled clock signal, wherein said retiming clock signal has a retiming clock rate equal to said data clock rate, said controlled clock signal has a controlled clock rate equal to said data clock rate and a controlled clock duty cycle proportional to said data clock rate;

wherein said retiming clock signal has a fixed retiming clock duty cycle;

wherein said controlled clock signal has a fixed asserted signal state duration;

said decision feedback equalization circuitry is further responsive to said incoming data signal, said retiming clock signal and said controlled clock signal by providing an equalized data signal;

said retimed equalized data signal corresponds to said equalized data signal; and said apparatus further comprises clock data recovery circuitry coupled between said decision feedback equalization circuitry and said clock circuitry, and responsive to said equalized data signal by providing said clock signal; and also wherein said decision feedback equalization circuitry comprises:

combining circuitry responsive to said incoming data signal and at least one or more equalization feedback signals by providing an equalized data signal;

first retiming circuitry coupled to said combining circuitry and responsive to said equalized data signal and a retiming clock signal by providing said retimed equalized data signal;

second retiming circuitry coupled to said first retiming circuitry and responsive to said retimed equalized data signal and said controlled clock signal by providing one or more additional retimed equalized data signals; and feedback circuitry coupled to said second retiming circuitry and responsive to said one or more additional retimed equalized data signals by providing said one or more equalization feedback signals.

2. The apparatus of claim 1, wherein one or more of said first and second retiming circuitries comprises latch circuitry.

3. The apparatus of claim 1, wherein one or more of said first and second retiming circuitries comprises shift register circuitry.

4. The apparatus of claim 1, wherein said clock circuitry comprises:

delay circuitry responsive to said clock signal by providing said retiming clock signal; and combining circuitry coupled to said delay circuitry and responsive to said clock signal and said retiming clock signal by providing said controlled clock signal.

5. A non-transitory computer readable medium comprising a plurality of executable instructions that, when executed by an integrated circuit design system, cause the integrated circuit design system to produce an integrated circuit (IC) including decision feedback equalizer operable with a plurality of data rates, comprising:

decision feedback equalization circuitry responsive to an incoming data signal, a retiming clock signal and a controlled clock signal by providing a retimed equalized data signal, wherein said incoming data signal has associated therewith a data clock having a data clock rate equal to one of a plurality of data clock rates; and clock circuitry coupled to said decision feedback equalization circuitry and responsive to a clock signal corresponding to said data clock by providing said retiming clock signal and said controlled clock signal, wherein said retiming clock signal has a retiming clock rate equal to said data clock rate, said controlled clock signal has a controlled clock rate equal to said data clock rate and a controlled clock duty cycle proportional to said data clock rate;

wherein said retiming clock signal has a fixed retiming clock duty cycle;

wherein said controlled clock signal has a substantially fixed asserted signal state duration;

also wherein:

said decision feedback equalization circuitry is further responsive to said incoming data signal, said retiming clock signal and said controlled clock signal by providing an equalized data signal;

said retimed equalized data signal corresponds to said equalized data signal; and said apparatus further comprises clock data recovery circuitry coupled between said decision feedback equalization circuitry and said clock circuitry, and responsive to said equalized data signal by providing said clock signal;

also wherein said decision feedback equalization circuitry comprises:

combining circuitry responsive to said incoming data signal and at least one or more equalization feedback signals by providing an equalized data signal;

first retiming circuitry coupled to said combining circuitry and responsive to said equalized data signal and a retiming clock signal by providing said retimed equalized data signal;

second retiming circuitry coupled to said first retiming circuitry and responsive to said retimed equalized data signal and said controlled clock signal by providing one or more additional retimed equalized data signals; and feedback circuitry coupled to said second retiming circuitry and responsive to said one or more additional retimed equalized data signals by providing said one or more equalization feedback signals.

6. The non-transitory computer readable medium of claim 5, wherein said clock circuitry comprises:

delay circuitry responsive to said clock signal by providing said retiming clock signal; and combining circuitry coupled to said delay circuitry and responsive to said clock signal and said retiming clock signal by providing said controlled clock signal.

7. A method of providing decision feedback equalization of a data signal having one of a plurality of data rates, comprising:

receiving an incoming data signal having associated therewith a data clock having a data clock rate equal to one of a plurality of data clock rates generating, in accordance with a clock signal corresponding to said data clock, a retiming clock signal and a controlled clock signal, wherein
said retiming clock signal has a retiming clock rate equal to said data clock rate, and
said controlled clock signal has a controlled clock rate equal to said data clock rate and a controlled clock duty cycle proportional to said data clock rate;
performing decision feedback equalization of said an incoming data signal in accordance with said retiming clock signal and said controlled clock signal;
wherein said retiming clock signal has a fixed retiming clock duty cycle;
wherein said controlled clock signal has a fixed asserted signal state duration;
equalizing said incoming data signal in accordance with said retiming clock signal and said controlled clock signal to provide an equalized data signal, wherein said retimed equalized data signal corresponds to said equalized data signal; and
recovering said data clock from said equalized data signal to provide said clock signal;
combining incoming data signal and at least one or more equalization feedback signals by providing an equalized data signal;
wherein said equalized data signal and a retiming clock signal are combined providing said retimed equalized data signal;
wherein combined said retimed equalized data signal and said controlled clock signal provide one or more additional retimed equalized data signals; and
one or more additional retimed equalized data signals provide said one or more equalization feedback signals.

8. The method of claim 7, wherein said generating, in accordance with a clock signal corresponding to said data clock, a retiming clock signal and a controlled clock signal comprises:
delaying said clock signal to provide said retiming clock signal; and
combining said clock signal and said retiming clock signal to provide said controlled clock signal.

* * * * *